(12) United States Patent
Vandergon et al.

(10) Patent No.: US 10,786,924 B2
(45) Date of Patent: Sep. 29, 2020

(54) WATERJET CUTTING HEAD TEMPERATURE SENSOR

(71) Applicant: HYPERTHERM, INC., Hanover, NH (US)

(72) Inventors: Cedar Vandergon, New Brighton, NH (US); David Osterhouse, New Brighton, NH (US); Edward M. Shipulski, Etna, NH (US); Michael Hoffa, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/974,557

(22) Filed: May 8, 2018

(65) Prior Publication Data

US 2018/0257253 A1    Sep. 13, 2018

Related U.S. Application Data

(63) Continuation-in-part of application No. 14/641,897, filed on Mar. 9, 2015, now Pat. No. 9,993,934.

(Continued)

(51) Int. Cl.
*B26F 1/26* (2006.01)
*B26F 3/00* (2006.01)
(Continued)

(52) U.S. Cl.
CPC .............. *B26F 3/004* (2013.01); *G01K 1/024* (2013.01); *G01K 1/14* (2013.01); *G01K 1/143* (2013.01); *B24C 5/04* (2013.01)

(58) Field of Classification Search
CPC .......... B26F 3/004; G01K 1/024; G01K 1/14; G01K 1/143; B24C 5/04
See application file for complete search history.

(56) References Cited

U.S. PATENT DOCUMENTS 2,985,050 A   5/1961   Schwacha
3,010,012 A   11/1961  Tuthill
(Continued)

FOREIGN PATENT DOCUMENTS

CA   2439213 C   10/2006
CN   1919516 A   2/2007
(Continued)

OTHER PUBLICATIONS

Examination Report for corresponding Australian Patent Application No. 2013243978, dated Nov. 17, 2015, 4 pages.
(Continued)

*Primary Examiner* — Omar Flores Sanchez
(74) *Attorney, Agent, or Firm* — David B. Tingey; Bryant J. Keller; Kirton McConkie (57) ABSTRACT

A pressurized fluid jet cutting head is provided. The cutting head includes a body having one or more component parts coupled together, wherein a junction in the cutting head is defined between a first component part having a first engagement surface and a second component part having a second engagement surface, wherein the first and second engagement surfaces abut at the junction. A temperature sensor is positioned in thermal communication with the body and is configured to measure a temperature value of at least one of the first component part, the second component part, and the junction. The temperature value is communicated to a controller for analysis, wherein the controller receives the measured temperature value and communicates operating instructions for the cutting head based on a comparison of the measured temperature value to a predetermined value.

20 Claims, 3 Drawing Sheets

Related U.S. Application Data (60) Provisional application No. 61/949,922, filed on Mar. 7, 2014.

(51) Int. Cl.
  *G01K 1/14* (2006.01)
  *G01K 1/02* (2006.01)
  *B24C 5/04* (2006.01)

(56) References Cited

U.S. PATENT DOCUMENTS

| | | |
|---|---|---|
| 3,018,360 A | 1/1962 | Engel |
| 3,518,401 A | 6/1970 | Mathews |
| 3,602,683 A | 8/1971 | Hishida et al. |
| 3,996,070 A * | 12/1976 | Fletcher ................ G01K 1/143 |
| | | 136/233 |
| 4,125,754 A | 11/1978 | Wasserman et al. |
| 4,497,029 A | 1/1985 | Kiyokawa |
| 4,519,835 A | 5/1985 | Gauvin et al. |
| 4,588,880 A | 5/1986 | Hesser |
| 4,733,052 A | 3/1988 | Nilsson et al. |
| 4,742,470 A | 5/1988 | Juengel |
| 4,929,811 A | 5/1990 | Blankenship |
| 5,018,670 A | 5/1991 | Chalmers |
| 5,050,106 A | 9/1991 | Yamamato et al. |
| 5,086,655 A | 2/1992 | Fredericks et al. |
| 5,099,226 A | 3/1992 | Andrews |
| 5,248,867 A | 9/1993 | Ohba et al. |
| 5,309,683 A | 5/1994 | Hockett |
| 5,357,076 A | 10/1994 | Blankenship |
| 5,381,487 A | 1/1995 | Shamos |
| 5,388,965 A | 2/1995 | Fehn |
| 5,390,964 A | 2/1995 | Gray, Jr. |
| 5,400,389 A | 3/1995 | Niiyama et al. |
| 5,440,477 A | 8/1995 | Rohrberg et al. |
| 5,500,512 A | 3/1996 | Goldblatt |
| 5,556,562 A | 9/1996 | Sorenson |
| 5,653,264 A | 8/1997 | Atkinson |
| 5,717,187 A | 2/1998 | Rogozinski et al. |
| 5,860,849 A | 1/1999 | Miller |
| 5,994,663 A | 11/1999 | Lu |
| 6,047,579 A | 4/2000 | Schmitz |
| 6,130,407 A | 10/2000 | Villafuerte |
| 6,133,542 A | 10/2000 | Dvorak et al. |
| 6,201,207 B1 | 3/2001 | Maruyama et al. |
| 6,248,975 B1 | 6/2001 | Lanouette et al. |
| 6,259,059 B1 | 7/2001 | Hsu |
| 6,267,291 B1 | 7/2001 | Blankenship et al. |
| 6,326,583 B1 | 12/2001 | Hardwick et al. |
| 6,409,476 B2 | 6/2002 | Mills |
| 6,479,793 B1 | 11/2002 | Wittmann et al. |
| 6,510,984 B2 | 1/2003 | Blankenship et al. |
| 6,539,813 B1 | 4/2003 | Horiuchi et al. |
| 6,563,085 B2 | 5/2003 | Lanouette et al. |
| 6,657,162 B1 | 12/2003 | Jung et al. |
| 6,659,098 B1 | 12/2003 | Sekiya |
| 6,693,252 B2 | 2/2004 | Zhang et al. |
| 6,707,304 B2 | 3/2004 | Buhler et al. |
| 6,717,096 B2 | 4/2004 | Hewett et al. |
| 6,729,468 B1 | 5/2004 | Dobmeier |
| 6,772,040 B1 | 8/2004 | Picard et al. |
| 6,781,085 B2 | 8/2004 | Ulrich et al. |
| 6,836,698 B2 | 12/2004 | Fujishima et al. |
| 6,852,949 B2 | 2/2005 | Lanouette et al. |
| 6,919,526 B2 | 7/2005 | Kinerson et al. |
| 6,933,462 B2 | 8/2005 | Iriyama et al. |
| 6,960,737 B2 | 11/2005 | Tatham |
| 6,980,704 B2 | 12/2005 | Kia et al. |
| 6,992,262 B2 | 1/2006 | Matus et al. |
| 6,995,545 B2 | 2/2006 | Tracy et al. |
| 7,030,337 B2 | 4/2006 | Baker et al. |
| 7,032,814 B2 | 4/2006 | Blankenship |
| 7,115,833 B2 | 10/2006 | Higgins et al. |
| 7,186,944 B2 | 3/2007 | Matus et al. |
| 7,307,533 B2 | 12/2007 | Ishii |
| 7,358,458 B2 | 4/2008 | Daniel |
| 7,375,302 B2 | 5/2008 | Twarog et al. |
| 7,411,154 B2 | 8/2008 | Fosbinder et al. |
| 7,645,960 B2 | 1/2010 | Stava |
| 7,671,294 B2 | 3/2010 | Belashchenko et al. |
| 7,680,625 B2 | 3/2010 | Trowbridge et al. |
| 7,728,401 B2 * | 6/2010 | Takatori ................ G01K 1/14 |
| | | 257/467 |
| 7,755,484 B2 | 7/2010 | Cullen et al. |
| 7,843,334 B2 | 11/2010 | Kumagai et al. |
| 8,035,487 B2 | 10/2011 | Malackowski |
| 8,085,150 B2 | 12/2011 | Oberle |
| 8,141,240 B2 | 3/2012 | Hiew et al. |
| 8,203,095 B2 | 6/2012 | Storm et al. |
| 8,204,618 B2 | 6/2012 | Young, Jr. et al. |
| 8,242,907 B2 | 8/2012 | Butler et al. |
| 8,263,896 B2 | 9/2012 | Schneider |
| 8,272,794 B2 | 9/2012 | Silchenstedt et al. |
| 8,278,588 B2 | 10/2012 | Salsich et al. |
| 8,316,742 B2 | 11/2012 | Craig |
| 8,373,084 B2 | 2/2013 | Salsich |
| 8,376,671 B2 | 2/2013 | Kaneko |
| 8,395,076 B2 | 3/2013 | Matus |
| 8,431,862 B2 | 4/2013 | Kachline |
| 8,620,738 B2 | 12/2013 | Fordyce, III et al. |
| 8,658,941 B2 | 2/2014 | Albrecht |
| 8,686,318 B2 | 4/2014 | Albrecht |
| 8,748,776 B2 | 6/2014 | Albrecht |
| 8,759,715 B2 | 6/2014 | Narayanan et al. |
| 8,766,132 B2 | 7/2014 | Blankenship et al. |
| 8,859,828 B2 | 10/2014 | Liu et al. |
| 8,859,928 B2 | 10/2014 | Sommerfeld |
| 9,031,683 B2 | 5/2015 | Elfstrom et al. |
| 9,129,330 B2 | 9/2015 | Albrecht et al. |
| 9,229,436 B2 | 1/2016 | Stumpfl et al. |
| 9,233,480 B2 | 1/2016 | Nagai et al. |
| 9,316,546 B2 * | 4/2016 | Tsubaki ................ G01K 1/14 |
| 2002/0117484 A1 | 8/2002 | Jones et al. |
| 2002/0194064 A1 | 12/2002 | Parry et al. |
| 2003/0025598 A1 | 2/2003 | Wolf et al. |
| 2003/0029934 A1 * | 2/2003 | Hashish ................ B24C 1/045 |
| | | 239/423 |
| 2003/0094487 A1 | 5/2003 | Blankenship et al. |
| 2003/0148709 A1 | 8/2003 | Anand et al. |
| 2004/0004064 A1 | 1/2004 | Lanouette et al. |
| 2004/0031776 A1 | 2/2004 | Gevelber et al. |
| 2004/0106101 A1 | 6/2004 | Evans |
| 2004/0173583 A1 | 9/2004 | Iriyama et al. |
| 2004/0193307 A1 | 9/2004 | Fujishima et al. |
| 2005/0045599 A1 | 3/2005 | Matus |
| 2005/0077273 A1 | 4/2005 | Matus et al. |
| 2005/0109738 A1 | 5/2005 | Hewett et al. |
| 2005/0145688 A1 | 7/2005 | Milenkovic et al. |
| 2005/0173390 A1 | 8/2005 | Lanouette et al. |
| 2005/0266777 A1 * | 12/2005 | Yoon ................ B24C 1/003 |
| | | 451/40 |
| 2006/0006154 A1 | 1/2006 | Koike |
| 2006/0020415 A1 * | 1/2006 | Hardwicke ............ G01K 1/024 |
| | | 702/133 |
| 2006/0070986 A1 | 4/2006 | Ihde et al. |
| 2006/0163216 A1 | 7/2006 | Brandt et al. |
| 2006/0163228 A1 | 7/2006 | Daniel |
| 2006/0163230 A1 | 7/2006 | Kaufman |
| 2006/0201923 A1 | 9/2006 | Hutchison |
| 2006/0215389 A1 | 9/2006 | Fosbinder et al. |
| 2006/0289406 A1 | 12/2006 | Helenius et al. |
| 2007/0012099 A1 | 1/2007 | Becourt |
| 2007/0051711 A1 | 3/2007 | Kachline |
| 2007/0080149 A1 | 4/2007 | Albrecht |
| 2007/0080150 A1 | 4/2007 | Albrecht |
| 2007/0080151 A1 | 4/2007 | Albrecht |
| 2007/0080152 A1 | 4/2007 | Albrecht |
| 2007/0080153 A1 | 4/2007 | Albrecht et al. |
| 2007/0193988 A1 | 8/2007 | De Joannis et al. |
| 2007/0210034 A1 | 9/2007 | Mather et al. |
| 2007/0294608 A1 | 12/2007 | Winterhalter et al. |
| 2008/0001752 A1 | 1/2008 | Bruns |
| 2008/0011821 A1 | 1/2008 | Ellender et al. |
| 2008/0023451 A1 | 1/2008 | Salsich et al. |

(56) References Cited

U.S. PATENT DOCUMENTS

| | | |
|---|---|---|
| 2008/0061049 A1 | 3/2008 | Albrecht |
| 2008/0066596 A1 | 3/2008 | Yamaguchi |
| 2008/0083711 A1 | 4/2008 | Twarog et al. |
| 2008/0093476 A1 | 4/2008 | Johnson et al. |
| 2008/0118253 A1 | 5/2008 | Abe |
| 2008/0149608 A1 | 6/2008 | Albrecht |
| 2008/0149686 A1 | 6/2008 | Daniel et al. |
| 2008/0156783 A1 | 7/2008 | Vanden Heuvel |
| 2008/0223952 A1 | 9/2008 | Wernli et al. |
| 2008/0257874 A1 | 10/2008 | Kaufman et al. |
| 2008/0308641 A1 | 12/2008 | Finn |
| 2009/0008370 A1 | 1/2009 | Salsich et al. |
| 2009/0057286 A1 | 3/2009 | Ihara et al. |
| 2009/0065489 A1 | 3/2009 | Duffy |
| 2009/0078196 A1 | 3/2009 | Midorikawa |
| 2009/0107960 A1 | 4/2009 | Hampton |
| 2009/0152255 A1 | 6/2009 | Ma |
| 2009/0159571 A1 | 6/2009 | Salsich |
| 2009/0159572 A1 | 6/2009 | Salsich |
| 2009/0159575 A1 | 6/2009 | Salsich |
| 2009/0159577 A1 | 6/2009 | Sommerfeld |
| 2009/0163130 A1 | 6/2009 | Zambergs |
| 2009/0175694 A1 | 7/2009 | Craig et al. |
| 2009/0184098 A1 | 7/2009 | Daniel et al. |
| 2009/0212027 A1 | 8/2009 | Borowy |
| 2009/0219136 A1 | 9/2009 | Brunet et al. |
| 2009/0222804 A1 | 9/2009 | Kaufman |
| 2009/0230097 A1 | 9/2009 | Liebold et al. |
| 2009/0240368 A1 | 9/2009 | Young, Jr. et al. |
| 2009/0288532 A1 | 11/2009 | Hashish |
| 2009/0294415 A1 | 12/2009 | Salsich et al. |
| 2010/0046210 A1 | 2/2010 | Mathai et al. |
| 2010/0078408 A1 | 4/2010 | Liebold et al. |
| 2010/0084381 A1 | 4/2010 | Indraczek et al. |
| 2010/0155377 A1 | 6/2010 | Lindsay et al. |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0114616 A1 | 5/2011 | Albrecht |
| 2011/0163857 A1 | 7/2011 | August et al. |
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0139692 A1 | 6/2012 | Neubauer et al. |
| 2012/0234803 A1 | 9/2012 | Liu et al. |
| 2012/0241428 A1 | 9/2012 | Kowaleski |
| 2012/0247293 A1 | 10/2012 | Nagai et al. |
| 2013/0001221 A1 | 1/2013 | Lambert |
| 2013/0068732 A1 | 3/2013 | Watson et al. |
| 2013/0087537 A1 | 4/2013 | Barnett et al. |
| 2013/0163637 A1* | 6/2013 | Parsons .................. G01K 1/14 374/179 |
| 2013/0179241 A1 | 7/2013 | Liu |
| 2013/0210319 A1 | 8/2013 | Gramling et al. |
| 2013/0253728 A1 | 9/2013 | Stumpfl et al. |
| 2013/0263420 A1 | 10/2013 | Shipulski et al. |
| 2013/0264317 A1 | 10/2013 | Hoffa et al. |
| 2013/0264320 A1 | 10/2013 | Shipulski |
| 2014/0069895 A1 | 3/2014 | Brine et al. |
| 2014/0116217 A1 | 5/2014 | Hashish |
| 2014/0335761 A1 | 11/2014 | Chou et al. |
| 2015/0108223 A1 | 4/2015 | Weitzhandler |
| 2015/0251267 A1* | 9/2015 | Winn .................. B23K 10/00 219/121.39 |
| 2015/0251331 A1* | 9/2015 | Vandergon .............. F04B 49/10 83/177 |
| 2015/0332071 A1 | 11/2015 | Hoffa et al. |
| 2015/0371129 A1 | 12/2015 | Hoffa et al. |
| 2016/0221108 A1 | 8/2016 | Hoffa et al. |
| 2017/0042011 A1 | 2/2017 | Sanders et al. |
| 2017/0042012 A1 | 2/2017 | Sanders et al. |
| 2017/0046544 A1 | 2/2017 | Ikemoto |
| 2017/0091634 A1 | 3/2017 | Ritter |

FOREIGN PATENT DOCUMENTS

| | | |
|---|---|---|
| EP | 508482 A2 | 10/1992 |
| EP | 1065620 A2 | 1/2001 |
| EP | 1117279 A1 | 7/2001 |
| EP | 1288016 A1 | 3/2003 |
| EP | 1516688 A1 | 3/2005 |
| EP | 1522371 A1 | 4/2005 |
| JP | 6163368 A | 4/1986 |
| JP | H05154732 A | 6/1993 |
| JP | H11285831 A | 10/1999 |
| JP | 2003025176 A | 1/2003 |
| JP | 2003048134 A | 2/2003 |
| JP | 2009252085 A | 10/2009 |
| JP | 2012048287 A | 3/2012 |
| JP | 2012079221 A | 4/2012 |
| RU | 2354460 C2 | 10/2008 |
| WO | 2007109636 A2 | 9/2007 |
| WO | 2008150136 A1 | 11/2008 |
| WO | 2008144785 A1 | 12/2008 |
| WO | 2009/076496 A2 | 6/2009 |
| WO | 2009/142941 A2 | 11/2009 |
| WO | 2010142858 A1 | 12/2010 |
| WO | 2013000700 A1 | 1/2013 |
| WO | 2013151602 A2 | 10/2013 |
| WO | 2013151886 A2 | 10/2013 |

OTHER PUBLICATIONS

International Search Report for International Application No. PCT/US2013/021364 dated Feb. 5, 2014, 4 pages.

International Search Report for International Application No. PCT/US2013/034572 dated Feb. 13, 2014, 4 pages.

International Search Report for International Application No. PCT/US2014/055638 dated Dec. 17, 2014, 5 pages.

Torchmate Arc Voltage Torch Height Control—Operation Manual, Applied Robotics, Inc., Oct. 2005, pp. 1-19.

International Search Report for International Application No. PCT/US2014/051106 dated Feb. 9, 2015, 5 pages.

Trumpf Press Release, New RFID lens provides LensLine sensor system with improved condition checking capabilities, online press release available https://www.opli.net/opli_magazine/eo/2013/trumpf-new-rfid-lens/, Aug. 12, 2013. (5 pages).

* cited by examiner

WATERJET CUTTING HEAD TEMPERATURE SENSOR

CROSS REFERENCE TO RELATED APPLICATION[S]

This application is a continuation-in-part of the earlier U.S. Utility Patent Application to Vandergon et al., entitled "LIQUID PRESSURIZED PUMP AND SYSTEMS WITH DATA STORAGE," Ser. No. 14/641,897, filed Mar. 9, 2015, which claims priority to U.S. Provisional Patent Application Ser. No. 61/949,922, filed Mar. 7, 2014, the disclosures of which are hereby incorporated entirely herein by reference.

BACKGROUND

Technical Field

This disclosure relates generally to water jets, and in particular to water jet cutting heads.

State of the Art

Waterjet cutting heads are an industrial tool capable of cutting a wide variety of materials using a very high-pressure jet of water or, alternatively, a mixture of water and an abrasive substance. Waterjet cutting is used during fabrication of machine parts and it is often the preferred method when the materials being cut are sensitive to the high temperatures generated by other cutting methods.

Waterjet cutting heads can sometimes leak, due to one or more varied reasons. The presence of the leak may degrade the waterjet cutting head or other component parts thereof. There is thus a need in the applicable industry to design and improve waterjet cutting head technology.

SUMMARY

This disclosure relates generally to water jets, and in particular to water jet cutting heads.

An aspect of the present disclosure includes a pressurized fluid jet cutting head, comprising: a body having one or more component parts coupled together; a junction defined between a first component part having a first engagement surface and a second component part having a second engagement surface, wherein the first and second engagement surfaces abut at the junction; and a temperature sensor in thermal communication with at least one of the first component part, the second component part, and the junction.

Another aspect of the present disclosure includes a method of detecting an error in a pressurized fluid jet cutting head, the method comprising: providing a cutting head having a first component part having a first interface and a second component part having a second interface, the first interface abutting the second interface; providing a temperature sensor in the cutting head for measuring a temperature associated with at least one of the first and second component parts; measuring a temperature by the temperature sensor; and indicating an error associated with the one of the first and second component parts upon detecting a temperature change.

Another aspect of the present disclosure includes receiving at a controller the measured temperature; comparing the measured temperature to one of a plurality of reference temperature profiles; correlating the measured temperature to one of the reference temperature profiles; and identifying the error based upon the correlated profile.

Another aspect of the present disclosure includes a method of operating a pressurized fluid jet cutting head, the method comprising: providing a cutting head having a plurality of component parts; providing a temperature sensor in the cutting head for measuring a temperature associated with at least one of the component parts; providing a controller in communication with the temperature sensor; measuring a temperature over a period of time; creating by a computer a temperature gradient profile; matching the temperature gradient profile with one of a plurality of reference temperature profiles stored in the controller; and controlling an operation of the cutting head based upon matching the temperature gradient profile to one of the reference profiles.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
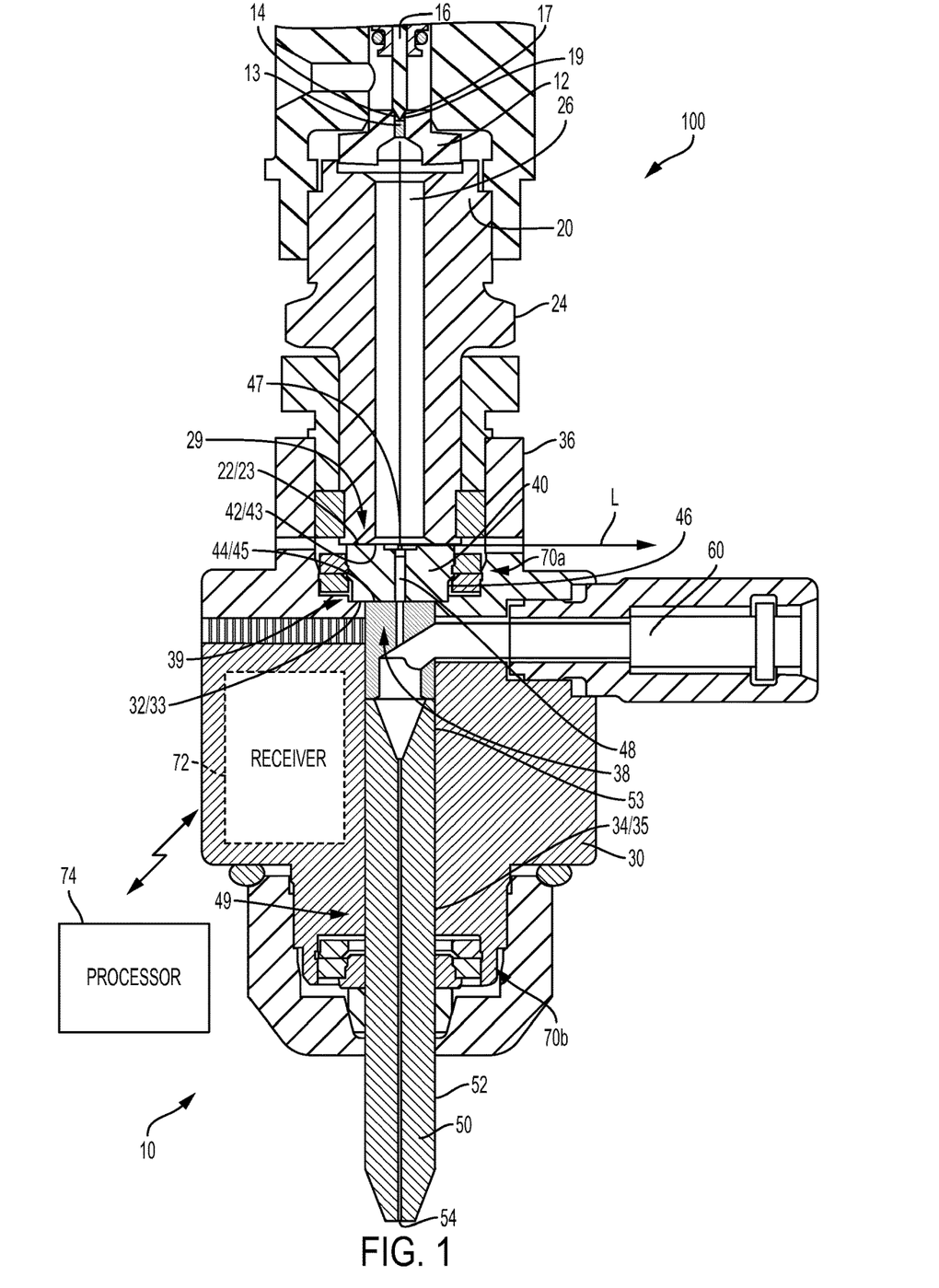
FIG. 1 is a cross-sectional front view of an embodiment of a cutting head that operates within a material processing system in accordance with the present disclosure.

Referring to the drawings, FIG. 1 is a cross-sectional view of an exemplary embodiment of a pressurized fluid jet cutting head 100 that operates within a material processing system (e.g., liquid jet cutting system). Embodiments of the cutting head 100 may comprise various structural and functional system components that complement one another to provide the unique functionality and performance of the cutting head 100 and the material processing system, the structure and function of which will be described in greater detail herein.

Embodiments of the material processing system may comprise components not depicted in the Figures, but which function together with the cutting head 100 to permit the cutting head 100 to operate according to its desired function. Such components may be, for example, a computer numerical controller (CNC), a positioning device, a high-pressure pump for delivering a high-pressure supply of working liquid to the cutting head 100, a high-pressure tubing, and an optional abrasive delivery system. The CNC may be configured to automate and optimize a cutting operation. The CNC may also serve as an operator's interface with the material processing system and can include hardware and/or software to enable cutting parameter and pump setting adjustments. The CNC may also control the motion of the positioning device (e.g., a XYZ cutting table, robotics, conveyor system, etc.) that is configured to position a workpiece and/or the cutting head 100 for precise cutting. The abrasive delivery system can interact with the CNC to meter a precise amount of abrasive for injection into the liquid jet stream produced by the cutting head 100.

As mentioned, the high-pressure pump may be configured to generate a high-pressure liquid flow for delivery to the cutting head 100 via the high-pressure tubing. To achieve these high pressures, the high-pressure pump may also include an intensifier comprising a dual-head reciprocating pump typically driven by the output from a hydraulic pump. In this arrangement, hydraulic fluid is cyclically applied to opposed sides of a relatively large diameter "piston" where the piston has attached to it first and second oppositely directed plungers of relatively smaller diameter and that fit within oppositely directed cylinders. In operation, during a pressure stroke in one cylinder, liquid is drawn through a low-pressure poppet into the other cylinder during its suction stroke. Thus, as the hydraulic piston and plunger assembly reciprocates back and forth, it delivers high pressure liquid out of one side of the intensifier while low pressure liquid fills the opposite side. In some embodiments, an attenuator or an accumulator is fluidly coupled to the intensifier to buffer out pressure fluctuation caused by the reversal of the intensifier.

Figure 2:
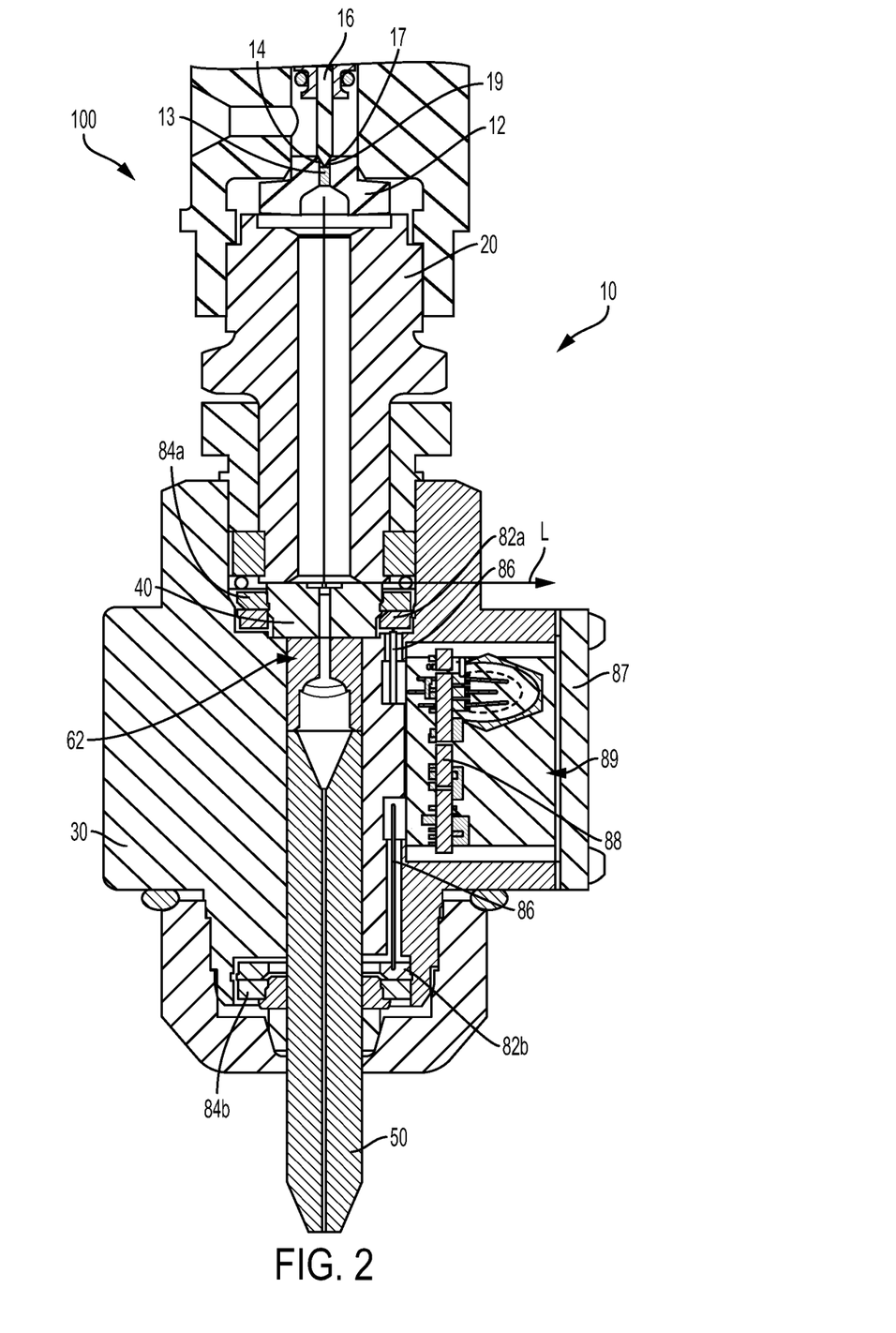
FIG. 2 is a cross-sectional side view of the embodiment of the cutting head of FIG. 1, in accordance with the present disclosure.

With reference to FIGS. 1 and 2, embodiments of the cutting head 100 may comprise a body 10. The body 10 may include an adapter 20, a housing 30, an orifice holder 40, and/or a nozzle 50, among other component parts. These various component parts are configured to releasably couple to one another to comprise the body 10 of the cutting head 100. The body 10 is designed and configured to receive therein and therethrough a high-pressure liquid flow and direct the liquid flow onto a workpiece (not depicted). The body 10 is configured to releasably couple to the positioning device as part of the larger material processing system. The body 10 may be comprised of rigid materials that are capable of withstanding pressurized liquid flows, such as metal and metal alloys, plastic and plastic alloys, ceramics, composites, any combinations thereof, or other like materials.

Embodiments of the cutting head may comprise the adapter 20. The adapter 20 can be an elongated member having at least a distal end 22, an exterior surface 24 and an inlet 26. The adapter 20 can be a substantially cylindrical member, having portions thereof assume a cylindrical shape. The inlet 26 can be an elongated through bore that runs the entire length of the adapter 20, such that the adapter 20 is open on each of its ends—a first end that allows the adapter 20 to releasably couple to the positioning member or another component part of the larger material processing system, and an opposing second end, which is the distal end 22. The inlet 26 can by a substantially cylindrical shape and configured to receive a pressurized flow or source of liquid and direct the pressurized flow through the adapter 20 toward the distal end 22. The distal end 22 of the adapter 20 is configured to have portions thereof that are an interface, sealing, or engagement surface 23 that are designed and configured to physically, functionally, and operationally communicate with, cooperate with, contact, or otherwise interface with or engage other surfaces within the body 10 to seal or effectively prevent the pressurized liquid flow from passing between the engagement surface 23 and other surfaces in contact therewith.

The adapter 20 may also comprise an exterior surface 24. The exterior surface 24 may be exposed to ambient air, thus constituting an exterior surface of the body 10, and/or the exterior surface 24 may contact, be coupled to, or be inserted within other component parts of the body 10, such that the exterior surface 24 of the adapter 20 is actually an interior surface of the body 10. For example, the exterior surface 24 near the distal end 22 may be configured to releasably couple to a fastening member, a housing 30, or another component part of the body 10, such that these other component parts at least partially overlap some portion of the exterior surface 24 of the adapter 20, thus making the exterior surface 24 of the adapter 20 an interior surface of the body 10.

Embodiments of the cutting head 100 may comprise the orifice holder 40. The orifice holder 40 can be a member having substantially cylindrical outer or exterior surface(s) 46, as well as first and second end surfaces, 42 and 44, that oppose one another in a flow direction of the pressurized liquid. The orifice holder 40 may be configured in the flow path of the pressurized liquid, such that the first end surface 42 engages the pressurized liquid flow. Moreover, similarly to the distal end 22, portions of the first end surface 42 are an engagement surface portion 43, or an interface or sealing surface. These engagement surface portion(s) 43 of the first end surface 42 are designed to physically, functionally, and operationally communicate with, cooperate with, interface with, contact, or otherwise engage at a junction 29 the engagement surface portion(s) 23 of the distal end 22. In other words, the engagement surface portion(s) 23 of the distal end 22 and the engagement surface portion(s) 43 of the first end surface 42 engage one another, for example, by friction fit, to seal or effectively prevent the pressurized liquid flow from passing therebetween, and in particular to effectively fluidically seal the junction 29 that exists because of the physical interaction between the adapter 20 and the orifice holder 40.

The orifice holder 40 may also include a portion thereof located centrally in the first end surface 42 that engages, houses, holds, sustains, or otherwise supports an orifice gem 47. The orifice gem 47 can be designed and configured to focus or otherwise constrict the flow of the pressurized liquid through the body 10. For example, the orifice gem 47 may have a type of pin-hole therethrough (not depicted) that functions to reduce the area through which the pressurized liquid may flow. The size of the pin-hole can vary depending on the material property and thickness of the workpiece being cut and is usually between 0.003 to 0.025 inches. According to principles of the Venturi effect, as the area through which the pressurized liquid flows decreases (i.e., pin hole of the orifice gem 47) the velocity of the liquid increases; consequently, the pressurized flow of liquid through the orifice gem 47 (in addition to the other components of the cutting head 100) results in a high-velocity liquid jet stream capable of operating on a workpiece, such as cutting entirely through or engraving upon the surfaces of the workpiece.

In relation thereto, the orifice holder 40 may comprise an internal conduit 48 running the entire length thereof from the first end surface 42 to the second end surface 44, the conduit 48 being oriented in a parallel configuration with the direction of flow of the pressurized liquid jet and configured to receive the flow of the pressurized liquid jet from the orifice gem 47 to direct the liquid jet through the orifice holder 40 and into the nozzle 50. Accordingly, the conduit 48 may be of a size and shape to cooperate with the size and shape of the orifice gem 47, and in most cases the size and shape of the conduit 48 is slightly larger than the diameter of the pin-hole of the orifice gem 47 so that the walls of the conduit 48 do not interfere with the high velocity liquid jet stream. Moreover, the axis of the pin-type hole of the orifice gem 47 and the axis of the conduit 48 may be axially aligned with one another to reduce interference or disruption of the liquid flow therethrough.

The orifice holder 40 may further comprise portions of the second end 44 that are an engagement surface 45 designed to physically, functionally, and operationally communicate with, cooperate with, contact, or otherwise engage other surfaces within the body 10 to seal or effectively prevent fluid from the high velocity liquid jet stream from passing between the engagement surface 45 and other surfaces in contact therewith.

Embodiments of the cutting head 100 may further comprise a housing 30. The housing 30 may be a member configured to functionally support, carry, or otherwise sustain the adapter 20, the orifice holder 40, and the nozzle 50. For example, the housing 30 can be configured to functionally engage the adapter 20 to secure, support, or otherwise maintain the adapter 20 and the housing 30 in a releasably coupled configuration with the orifice holder 40 positioned between the housing 30 and the adapter 20. The housing 30 may comprise an interior lip 32 configured to engage portions of the second end 44 of the orifice holder 40. The interior lip 32 may have portions thereof that function as an interface or engagement surface portion 33. These engagement surface portion(s) 33 of the interior lip 32 of the housing 30 are designed to physically, functionally, and operationally communicate with, cooperate with, interface with, contact, or otherwise engage at a junction 39 the engagement surface portion(s) 45 of the second end 44 of the orifice holder 40. In other words, the engagement surface portion(s) 33 of the interior lip 32 and the engagement surface portion(s) 45 of the second end surface 45 engage one another, for example, by friction fit, to seal or effectively prevent the high velocity liquid jet stream from passing therebetween, and in particular to effectively fluidically seal the junction 39 that exists because of the physical interaction between the orifice holder 40 and the housing 30.

Proximate the interior lip 32, the housing 30 may further define a mixing chamber 38. The mixing chamber 38 may be an opening, void or bore in a centralized portion of the housing 30. The mixing chamber 38 may be configured to communicate with the orifice holder 40 and specifically the second end 44 of the orifice holder 40. The conduit 48 in the orifice holder 40 may be configured to open up into the mixing chamber 38 such that the pressurized liquid jet that exits the orifice holder 40 at the second end 44 immediately enters the mixing chamber 38.

The housing 30 may additionally be configured to engage an abrasive inlet 60. The abrasive inlet 60 may be an optional component part that is coupled to an abrasive delivery system (not depicted), which is part of the larger material processing system. The abrasive delivery system can be configured to meter a precise amount of abrasive for injection into the pressurized liquid jet stream through the abrasive inlet 60 at the mixing chamber 38, such that the abrasive and the liquid can begin to mix together as one. As the liquid jet stream moves quickly through the mixing chamber 38 a Venturi effect is created, where the liquid pulls the abrasive into itself. The combined abrasive and liquid can thereafter enter the nozzle 50, which can function as an additional mixing tube of sorts by providing an elongated space (e.g., 2 to 4 inches) for the liquid and abrasive to mix prior to exiting the nozzle 50 at the opening 54 and reaching the workpiece.

The housing 30 may further comprise an interior surface 34 that functions to functionally or operationally engage the exterior surface 52 of the nozzle 50, such that the interior surface 34 of the housing 30 secures, supports, fixes, or otherwise maintains the nozzle 50 in a releasably coupled configuration with the housing 30. To do so, the interior surface 34 may have portions thereof that function as an interface, sealing, or engagement surface portion 35, and the exterior surface 52 may have portions thereof that function as an interface, sealing, or engagement surface portion 53. The engagement surface portion(s) 35 of the housing 30 and the engagement surface portions 53 of the nozzle 50 are designed to physically, functionally, and operationally communicate with, cooperate with, interface with, contact, or otherwise engage one another at a junction 49. In other words, the engagement surface portion(s) 35 of the interior surface 34 and the engagement surface portion(s) 53 of the exterior surface 52 engage one another, for example, by friction fit, to effectively prevent the high velocity liquid jet stream from passing therebetween, and in particular to effectively fluidically seal the junction 49 that exists because of the physical interaction between the housing 30 and the nozzle 50.

Embodiments of the cutting head 100 may further comprise a valve seat 12 and a valve needle 16. The valve seat 12 may be configured to releasably couple to the adapter 20 proximate the beginning of the inlet 26. The valve seat 12 may comprise a bore 13 in the centralized portion thereof. The valve needle 16 can be configured to communicate with the bore 13 of the valve seat 12, such that the valve needle 16 may move into contact with the bore 13 and out of contact with the bore 13. When in contact with the bore 13, the valve needle 16 may function to prevent the flow of the pressurized fluid from entering the valve seat 12 and the adapter 20. As such the bore 13 may have interface, sealing, or engagement portions 14 thereof that are configured to communicate with, interface with, or seal together with the corresponding interface, sealing, or engagement portions 17 of the valve needle 16, such that when the respective engagement portions 14 and 17 contact, interface with, or engage one another, they seal or effectively prevent the pressurized liquid flow from passing therebetween, and in particular to effectively fluidically seal the junction 19 that exists because of the physical interaction between the valve seat 12 and the valve needle 16.

Figure 3:
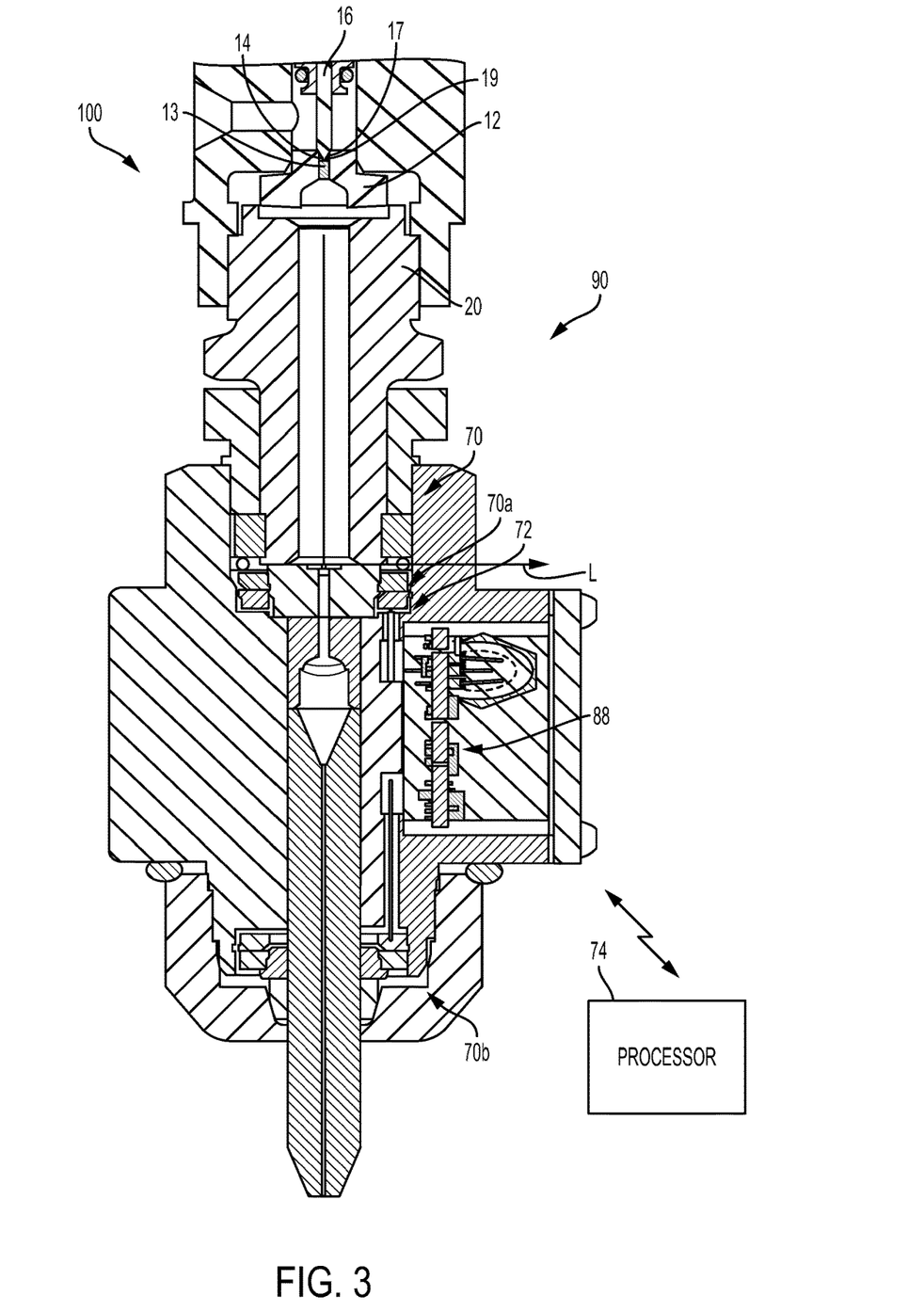
FIG. 3 is another cross-sectional side view of the embodiment of the cutting head of FIG. 1, in accordance with the present disclosure.

Referring now to FIG. 3, an exemplary communication network 90 associated with the cutting head 100 is depicted. The communication network 90 can include one or more signal devices 70 (e.g., 70a and 70b), each assigned to one or more components of the cutting head 100. For example, the signal device 70a can be assigned to the orifice holder 40 and the signal device 70b can be assigned to the nozzle 50. Each signal device 70 is adapted to transmit a signal associated with the respective component part to a receiver 72. Each signal device 70 can be an electrically writable device configured to transmit information about the respective component part in the form of one or more signals. Each signal device 70 can be a radio-frequency identification (RFID) tag or card, bar code label or tag, integrated circuit (IC) plate, or the like. In some embodiments, a signal device 70 is a detector (e.g., a sensor) for detecting a physical characteristic of the component part and transmitting the detected information in the form of one or more signals. The communication network 90 also includes at least one receiver 72 for: i) receiving signals transmitted by at least one of the signal devices 70; ii) extracting data conveyed by the signals; iii) providing the extracted data to a processor 74 for analysis and further action; and (iv) writing data to one or more of the signal devices 70 as instructed by the processor 74. The processor 74 can be a digital signal processor (DSP), microprocessor, microcontroller, computer, computer numeric controller (CNC) machine tool, programmable logic controller (PLC), application-specific integrated circuit (ASIC), or the like. The processor 74 can be integrated with the larger material processing system, such as within the CNC, or can be a stand-alone computing device.

Embodiments of the cutting head 100 comprise the signal device 70 being encoded with information pertaining to the component part to which the signal device 70 is assigned. The encoded information can be generic or fixed information such as the component part's name, trademark, manufacturer, serial number, and/or type. The encoded information, for example, can include a model number to generally indicate the type of the component part, such that the component part is an orifice assembly or a nozzle. In some embodiments, the encoded information is unique to the component part, such as material composition of the component part, material properties of the component part (e.g., thermal conductivity), weight of the component part, date, time and/or location at which the component part was manufactured, personnel responsible for the component part, and the like. As an example, the encoded information can provide a serial number, which is unique to each component part manufactured, to distinguish, for example, nozzle Type A, Serial #1 from nozzle Type A, Serial #2. As another example, the signal device 70a can store information related to the opening size of the orifice holder 40 and the signal device 70b can store information related to the opening size of the nozzle 50.

In some embodiments, information is encoded to a signal device 70 at the time of manufacture of the corresponding component part. Information can also be encoded to a signal device 70 during the lifetime of the component part, such as after each component part use. Encoded information can include the date, time, duration, and location of component part use, any abnormalities detected during use, and/or component part conditions after use.

In some embodiments, a signal device 70 is writable once, for example, to encode information about a component part when the component part is first manufactured. In some embodiments, a signal device 70 is writable multiple times, such as throughout the lifespan of the corresponding component part.

In some embodiments, each of the signal devices 70 is located inside of the cutting head 100 (e.g., on an interior surface of the cutting head body 10) and/or on a component part of the cutting head 100. For example, a signal device 70 can be attached to a surface of a component part that is ultimately installed inside of the cutting head 100. In an exemplary configuration, the signal device 70a for storing information about the orifice holder 40 is located on a surface of the orifice holder 40, such as the exterior surface 46, while the signal device 70b for storing information about the nozzle 50 is located on the exterior surface 52 of the nozzle 50. In addition, both signal devices 70a, 70b can be placed in low pressure regions of the cutting head 100 to minimize exposure to high pressure liquid during cut operations. Further in example, a signal device 70 may be positioned or attached to an exterior surface of a component part of the cutting head 100, such as the exterior surface 24 of the adapter 20, the exterior surface 36 of the housing 30, and/or the exterior surface 52 of the nozzle 50. Even further, a signal device 70 may be positioned remotely from the cutting head 100 but configured to measure a physical characteristic of a portion of, and/or component part of, the cutting head 100.

In some embodiments, a signal device 70 is designed to be durable, i.e., functional during and after one or more cutting operations. For example, the signal device 70a can be sufficiently robust to withstand ultrasonic cleaning of the orifice holder 40 to remove deposits. In some embodiments, certain cleaner is used to avoid harming the signal device 70a. In some embodiments, a signal device 70 is disposable after each cutting operation or after several operations.

Each of the signal devices 70 can wirelessly transmit its stored information to the receiver 72 in the form of one or more signals. The receiver 72 is adapted to process signals from each signal device 70 to extract pertinent data about the component part corresponding to the signal device 70 and forward the data to the processor 74 for analysis. In some embodiments, the receiver 72 is located in or on the cutting head 100. For example, the receiver 72 can be located in the cutting head 100 close to the signal device 70, such as in the housing 30 and/or on an internal surface of the cutting head body 10. In some embodiments, the receiver 72 is at a location external to the cutting head 100, such as attached to the processor 74.

With reference again to FIGS. 1 and 2, in some embodiments, the signal devices 70 are RFID tags, in which case the receiver 72 is a reader 82 used to interrogate one or both of the RFID tags 84a, 84b. Each of the readers 82a, 82b and corresponding tag 84a, 84b can include an antenna for receiving and transmitting signals. The reader(s) 82 can include: (1) an antenna for transmitting RF signals to the RFID tag 84 to communicate with and/or interrogate the tag 84; and (2) components for decoding a response transmitted by the RFID tag 84 before forwarding the response to the processor 74. The RFID tag can be either active or passive. An active RFID tag includes a battery to produce a stronger electromagnetic return signal to the reader, thereby increasing the possible transmission distance between the RFID tag and the reader. The distance between an RFID tag and a reader can be from proximate one another to 100 feet or more, depending on the power output, the radio frequency used and the type of material through which the RF signals need to travel. Using an RFID tag is advantageous because it does not require direct contact (e.g., via wires) or direct line of sight (e.g., via optical signals) with the reader and is well suited for use in harsh environments.

Another component in an RFID communication system is an interface board 88 (e.g., a printed circuit board) that implements middleware application for connecting the data from a reader 82 to an external host software system. The interface board 88 can perform one or more of the following functions: retrieving data from one or more readers 82, filtering data feeds to external application software, monitoring tag 84 and reader 82 network performance, capturing history, and converting analog signals received from a reader 82 to digital signals for external transmission. Yet another component in an RFID communication system is a connector (not depicted) configured to transmit the digital signal from the interface board 88 to the external host software system. In some embodiments, one reader 82 is used to interact with multiple RFID tags 84. Alternatively, multiple readers 82 can be used, each interacting with a respective one of the RFID tags 84*a*, 84*b*. In some embodiments, a single interface board 88 is used to connect information from one or more readers 82 to an external processor 74. Alternatively, multiple interface boards 88 can be used to connect respective ones of readers 82 to an external processor 74. In some embodiments, the interface board 88 may be equipped with wireless connectivity components to facilitate wirelessly communication with the processor 74 to thereby transfer data and signals therebetween. In some embodiments, the processor 74 may be a controller, such as the controller of the CNC. In some embodiments the processor 74 may be a controller embodied in a PC or other computer equipped for data analysis, program execution, and other computer-implemented actions.

Referring again to FIGS. 1 and 2, an exemplary design of a cutting head for housing an RFID communication system, such as for the cutting head 100, is depicted. FIG. 2 shows a cavity, void, or space 89 within, or defined by the housing 30. The interface board 88 may be positioned within the space 89 and wires 86 may run through channels within the housing 30, the wires 86 being configured to electrically couple the readers 82*a*, 82*b* with the interface board 88 to establish communication between the signal device(s) 70 and the interface board 88. The space 89 may be adapted to be fluidically sealed so that liquid may not enter and interfere with the operational aspects of the RFID communication system. For example, the housing 30 may further comprise a cap 87 that is configured to releasably couple to the housing 30 and fluidically seal the space 89. Further, when the cap 87 is removed from the housing 30, access is provided to the internal components within the space 89, such as the interface board 88 and associated component parts. Additionally, one or more sealing members (not depicted), such as a flexible neoprene gasket, can be employed in the channels or other entry points into the space 89 to prevent liquid (e.g., water) from seeping into the space 89 where the interface board 88 resides. The gasket(s) can include an opening to allow the wires 86 to pass therethrough while providing a waterproof seal.

Advantages of the communication network 90 being incorporated into a water jet cutting head, such as cutting head 100, include the processor 74 being adapted to automatically configure at least one operating parameter of the cutting head 100 based on the information encoded in or obtained by the one or more signal devices 70. For example, due to the use of abrasive in the liquid jet, the opening of the nozzle 50 may grow with time, thus affecting quality of cutting operations. Therefore, the signal device 70*b* associated with the nozzle 50 can store the size of the opening 54 of the nozzle 50, thus allowing the processor 74 to predict its growth and automatically adjust certain operating parameters, such as the kerf setting, to compensate for the predicted growth. As another example, the size of the pin-hole of the orifice gem 47 is correlated to the stroke rate of a pump (not depicted) that creates a stream of high pressure liquid. Hence, the processor 74 can use the pin-hole size information of the orifice gem 47 stored in the signal device 70*a* to predict the pump stroke rate. Accordingly, information stored on each or both of the signal devices 70 can be used by the processor 74 to perform the following adjustments: (i) adjust the composition/amount of additives into the liquid jet by interacting with the abrasive delivery system; (ii) adjust the positioning of the workpiece in relation to the cutting head 100 by adjusting the positioning device; and/or (iii) change the stroke rate of the pump. In some embodiments, the combination of information stored in the signal devices 70 allows the processor 74 to set up one or more of the cutting parameters automatically so as to optimize the efficiency and maximize the lifespan of the nozzle 50 and/or the orifice holder 40.

In addition to the foregoing, the signal devices 70 may further comprise thermal sensors, such as infrared (IR), conductive, and convective thermal sensors, and the information obtained by the one or more signal devices 70 may include thermal information, such as temperature. In other words, the signal devices 70 may be adapted to sense and/or obtain a temperature reading/measurement of a portion of, or component part of, the cutting head 100 with which the signal device 70 is associated. The signal device 70 configured with thermal sensing capability may be a direct temperature sensor in contact with a specific portion of, or component part of, the cutting head 100. On the other hand, the signal device 70 configured with thermal sensing capability may be an indirect temperature sensor that is able to measure at a distance a temperature of a specific portion of, or component part of, the cutting head 100.

Measuring and monitoring the temperature of the cutting head 100 can be an important indicator of cutting head 100 performance. Under normal operating conditions, a cutting head, such as cutting head 100 generates some expected amount of heat due to the pressure of the liquid, the velocity of the liquid generated by the orifice gem 47 and orifice holder 40, and, at times, the abrasive added to the pressurized liquid jet stream. The anticipated heat, or change in temperature, is primarily caused by the friction between the pressurized liquid moving through the cutting head 100 and its component parts, as described herein. However, when a cutting head, such as cutting head 100, develops a leak hole or undesired and unexpected opening in the body 10, portions of the pressurized liquid jet stream begin to travel through the leak hole and into unwanted portions of the cutting head 100. The resulting undesirable and inefficient performance of the cutting head 100 and increased friction therein can cause temperature change, including causing temperature levels of the component parts within the cutting head 100 to rise beyond satisfactory or acceptable levels. In addition, the anticipated heat can also be caused by the addition of the abrasive material to the liquid jet stream. Accordingly, the addition or subtraction of the abrasive material from the liquid jet stream may also cause temperature changes that can be detected.

Leaks in the cutting head 100 may be caused by many reasons, including damage to the sealing surfaces between component parts and/or inadequately tightening of the adapter 20, the housing 30, the nozzle 50, and/or the abrasive inlet 60 with one another, just to name a few. Leaks may also be caused by a misalignment of component parts with one another, such as, but not limited to, the adapter 20, the housing 30, the nozzle 50, and/or the abrasive inlet 60. A misalignment may consist of the engagement, interface or sealing surfaces of one or more of the component parts being slightly offset or incongruent, such that a liquid seal is not established, or not completely established, between component parts. A misalignment may consist of the component parts not being axially aligned with one another upon assembly of the cutting head 100. The axial misalignment may cause the situation described above where the engagement, interface or sealing surfaces of one or more of the component parts are slightly offset or incongruent, such that a liquid seal is not established, or not completely established, between one or more of these component parts.

Also, when leaks develop, the high pressure pushes the liquid through the leak and into parts of the cutting head 100 that aren't normally accustomed to liquid and even into portions where liquid could damage other component parts, such as, for example, the communication network 90 and its associated electronic components. What's more, the electric component parts may also be susceptible to damage from high or extreme temperatures and/or prolonged exposure to elevated temperatures produced by the leak.

Embodiments of the cutting head 100 may thus comprise the signal devices 70 being configured to sense and/or obtain a temperature reading of a portion of, and/or a component part of, the cutting head 100 with which the signal device 70 is associated, report the information to the interface board 88, and transmit the information to the processor 74 for further action, including the processor 74 shutting down the cutting head 100 to preserve the component parts of the cutting head 100. Moreover, the positional location of the particular signal device 70 that detects the temperature rise in the cutting head 100 may also assist the processor 74 and/or user to begin to identify where the leak occurred on the cutting head 100.

As disclosed herein, in some embodiments, a signal device 70 is a detector (e.g., a sensor) for detecting a physical characteristic of the component part and transmitting the detected information in the form of one or more signals. In some embodiments, the physical characteristic of the component part to be detected is a temperature value. The signal device 70 may be one or more types of sensor for sensing temperature value or variation in temperature. For example, the signal device(s) 70 may be an indirect temperature sensor, such as an IR sensor or a convective sensor. These types of sensors permit the signal device 70 to be positioned remotely from the cutting head 100 and yet positioned appropriately to measure the temperature of one or more locations, or parts, of the cutting head 100, such as, for example, the adapter 20, the housing 30, and/or positions on the cutting head 100 proximate the internal junctions 29 and 39 between the adapter 20, the orifice holder 40, and the housing 30. Once the temperature measurement is obtained, these remotely positioned signal devices 70 may communicate the information to the processor 74 for evaluation. Further in example, the signal device(s) 70 may be positioned in or on the cutting head 100 so as to be in direct contact with a portion of, and/or a component part of, the cutting head 100. Being in direct contact allows the signal device 70 to directly measure the temperature value and communicate the information to the processor 74 for evaluation. The signal device 70 may be incorporated into or may be a component part of the interface board 88, such that the interface board 88 is capable of measuring the temperature of the interface board 88 or the space 89 in which the interface board 88 is positioned. The signal device 70 may be positioned on a surface of a component part of the cutting head 100, such as an exterior surface 24, 36, and/or 52 and/or an interior surface of the body 10 (surfaces 46, 34), so that the signal device 70 can directly measure the temperature of the surface on which the signal device 70 is positioned. As depicted in FIGS. 1 and 2, the signal device 70 may be a RFID communication system that directly measures the component part to which the tag 84 is coupled (e.g., the adapter 20, the orifice holder 40, and/or the nozzle 50). The tag 84 is adapted to have an on-board temperature sensor that stores the temperature data and communicates with the reader 82 to thereby send the data to the interface board 88 and thereafter the processor 74 for further evaluation. In some embodiments, one of the tags 84a and associated reader 82a can be strategically positioned near the exterior surface 46 of the orifice holder 40 to measure the temperature of the orifice holder 40 and another of the tags 84b and associated reader 82b can be strategically positioned near the interior surface 34 of the housing 30 to measure the temperature of the nozzle 50. Additionally, one of the tags 84a and associated reader 82a can be strategically positioned near one or more of the junctions 29 and 39 to measure the temperature of the component parts that define the respective junctions 29 and 39, and the another of the tags 84b and associated reader 82b can be strategically positioned near the junction 49 to measure the temperature of the component parts that define the respective junction 49.

Embodiments of the cutting head 100 can comprise the processor 74 being adapted to alter the performance and operation of the cutting head 100 based on the information received, and in particular the temperature information received. The processor 74 can comprise an algorithm or software adapted to analyze the temperature information and provide instructions to the material processing system according to the information received. For example, the processor 74 may be adapted to receive the temperature measurement values of one or all of the signal devices 70 in operation with the cutting head 100. In other words, the processor 74 is capable of receiving a temperature measurement value from a signal device 70 of the remotely-positioned, indirect variety, as well as a temperature value from a signal device 70 of the RFID internally-positioned, direct variety.

The processor 74 may be adapted to compare each of the measured temperature values received from the one or more signal devices 70 to a predetermined temperature value or threshold. The predetermined temperature value or threshold may be a different temperature value for each portion of the cutting head 100 or for each component part of the cutting head 100. For example, the predetermined temperature threshold for the signal device 70 proximate the exterior surface 46 of the orifice holder 40 may be different than the predetermined temperature threshold for the signal device 70 remotely located or positioned on an external surface of the cutting head 100.

In operation, should the received or measured temperature exceed the predetermined temperature threshold, the processor 74 may instruct the material processing system to shut down the cutting head 100 to conserve the longevity or functionality of the component parts of the cutting head 100, including the electronic component parts. Alternatively, the processor 74 may analyze one or more threshold values and issue a warning should the measured temperature exceed the first threshold value and issue a second warning should the measured temperature exceed the second threshold value, and so on and so forth until the ultimate threshold value is exceeded, at which point the processor 74 instructs the material processing system to cease operation of the cutting head 100.

Further in example, the processor 74 may be adapted to calculate a rate of change, or a temperature gradient, of the measured temperature values received over time from any of the signal devices 70. Using the rate of change as a predetermined temperature threshold, the processor 74 may compare the calculated rate of change, or temperature gradient, with a predetermined rate of change value or threshold. Should the calculated rate of temperature change exceed the predetermined rate threshold, the processor 74 may instruct the material processing system to shut down the cutting head 100 to conserve the longevity or functionality of the component parts of the cutting head 100, including the electronic component parts. Similarly to the instructions above, the processor 74 may make one or more comparisons of the calculated temperature gradient with one or more threshold temperature gradients and provide the corresponding instruction, such as issuing a first warning, second warning, error message, or shut-down message, depending on which threshold temperature gradient has been exceeded. For example, surpassing a lower-level temperature gradient threshold may trigger a simple error message or a warning, whereas surpassing a highest-level temperature gradient threshold would trigger an immediate shut-down instruction or message.

In addition, the processor 74 may be adapted to combine the above-mentioned examples and compare both the measured temperature value with the predetermined threshold as well as the rate of change calculated value with the rate of change predetermined threshold. Should one or both values exceed the threshold, the processor 74 may instruct the material processing system to shut down the cutting head 100 to conserve the longevity or functionality of the component parts of the cutting head 100, including the electronic component parts.

Embodiments of the cutting head 100 may comprise the communication network 90 being manufactured into the cutting head 100 at the time of manufacture of its component parts or may comprise the communication network 90 being retrofitted onto existing cutting heads, post-manufacture. In this way, the leak detection technology and the temperature sensing technology can be incorporated onto existing and/or new cutting heads 100 to preserve the useful life and operation of the cutting heads 100.

In addition to the structural disclosure of the cutting head 100, methods of detecting an error in the cutting head 100 are also described herein. Methods of detecting an error in a pressurized fluid jet cutting head can comprise providing a cutting head having a first component part having a first interface (i.e., interface surface, engagement surface or sealing surface) and a second component part having a second interface (i.e., interface surface, engagement surface or sealing surface) with the first interface abutting the second interface. A temperature sensor can be provided in the cutting head for measuring a temperature associated with the first and second interfaces (i.e., the junction established between the first and second interfaces). The method can further include measuring a temperature of the fluid jet cutting head and indicating an error associated with the cutting head and/or one or more of the first and second component parts upon detecting a temperature change in the cutting head. The method may further include the error including a location position of a leak path of the pressurized liquid in the cutting head identifiable depending upon which of the signal devices in the cutting head measured the temperature change.

The methods may further comprise the first component part being the orifice holder and the second component part being one of the adapter and the nozzle. Also, the first component part can be the valve and the second component part can be the valve seat. The method may further include the error message indicating a misalignment of component parts or between the first and second component parts.

The methods may further comprise the indicating an error step including the steps of receiving the measured temperature by a controller, comparing the measured temperature to one of a plurality of reference temperature profiles, correlating the measured temperature to one of reference temperature profile, and identifying the error based upon the correlated profile. The methods may further comprise the step of measuring including the step of creating a temperature profile over time.

The methods may further comprise detecting an error in a pressurized fluid jet cutting head by providing a cutting head having a first head component having a first interface and a second head component having a second interface, the first interface abutting the second interface, providing a temperature sensor in the cutting head for measuring a temperature associated with first and second interfaces, providing a controller in communication with the temperature sensor, measuring a temperature of the fluid jet cutting head over a period of time, creating a temperature over time profile by the controller, matching the temperature over time profile with one of a plurality of reference temperature profiles stored in the controller; and indicating an error associated with the one of the first and second head components based upon matching the temperature over time profile to one of the reference profiles.

The methods may further comprise operating a pressurized fluid jet cutting head by providing a cutting head having a plurality of component parts, providing a temperature sensor in the cutting head for measuring a temperature associated with at least one of the component parts, providing a controller in communication with the temperature sensor, measuring a temperature over a period of time, creating by a computer a temperature gradient profile, matching the temperature gradient profile with one of a plurality of reference temperature profiles stored in the controller; and controlling an operation of the cutting head based upon matching the temperature gradient profile to one of the reference profiles, including shutting down the cutting head.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A pressurized fluid jet cutting head, comprising:
   a body having two or more component parts coupled together;
   a junction defined between a first component part having a first engagement surface and a second component part having a second engagement surface, wherein the first and second engagement surfaces abut at the junction; and
   a temperature sensor in thermal communication with at least one of the first component part, the second component part, and the junction, wherein the body defines a flow path of a pressurized liquid, and wherein the temperature sensor is physically separated from the flow path of the pressurized liquid.

2. The cutting head of claim 1, wherein the first component part comprises an orifice holder and the second component part comprises one of an adapter, a housing and a nozzle.

3. The cutting head of claim 1, wherein the first component part comprises a valve seat and the second component part comprises a valve needle.

4. The cutting head of claim 1, wherein the temperature sensor is positioned internal to the body.

5. The cutting head of claim 1, wherein the temperature sensor is positioned on an external surface of the body.

6. The cutting head of claim 1, wherein the temperature sensor is positioned internal to the body on an exterior surface of one of the first and second component parts.

7. The cutting head of claim 1, wherein the temperature sensor is positioned internal to the body and proximate the junction.

8. The cutting head of claim 1, further comprising an interface board associated with the body, wherein the temperature sensor is associated with the interface board.

9. The cutting head of claim 8, wherein the temperature sensor is built into the interface board.

10. The cutting head of claim 1, wherein the temperature sensor comprises an RFID system having its tag and reader positioned internal to the body and proximate an exterior surface of one of the first and second component parts.

11. The cutting head of claim 1, further comprising a controller in communication with the temperature sensor, wherein the controller is configured to receive a signal representing a measured temperature value and communicate information for the operation of the cutting head based on a comparison of the measured temperature value to a predetermined value.

12. A method of detecting an error in a pressurized fluid jet cutting head, the method comprising:
   providing a cutting head having a first component part having a first interface and a second component part having a second interface, the first interface abutting the second interface;
   providing a temperature sensor in the cutting head for measuring a temperature associated with at least one of the first and second component parts;
   measuring a temperature by the temperature sensor; and
   indicating an error associated with the one of the first and second component parts upon detecting a temperature change.

13. The method of claim 12, wherein the temperature change is greater than a predetermined temperature change.

14. The method of claim 12, wherein the error comprises a leak path of pressurized fluid in the cutting head.

15. The method of claim 14, wherein the leak path is identifiable from the position of the temperature sensor in the cutting head.

16. The method of claim 12, wherein the first component part comprises an orifice holder and the second component part comprises an adapter.

17. The method of claim 12, wherein the error comprises a misalignment of the first and second component parts.

18. The method of claim 12, wherein the indicating an error further comprises:
   receiving at a controller a signal indicative of the measured temperature;
   comparing the measured temperature to one of a plurality of reference temperature profiles;
   correlating the measured temperature to one of the reference temperature profiles; and
   identifying the error based upon the correlated profile.

19. A method of operating a pressurized fluid jet cutting head, the method comprising:
   providing a cutting head having a plurality of component parts;
   providing a temperature sensor in the cutting head for measuring a temperature associated with at least one of the component parts;
   providing a controller in communication with the temperature sensor;
   measuring a temperature over a period of time;
   creating a temperature profile based upon the measuring the temperature over a period of time;
   comparing the temperature profile with one of a plurality of reference temperature profiles stored in the controller; and
   controlling an operation of the cutting head based upon comparing the temperature profile to one of the reference profiles.

20. The method of claim 19, wherein the controlling an operation of the cutting head further comprises shutting down the cutting head.

* * * * *